No. 648,325. Patented Apr. 24, 1900.
S. H. ADAMS.
APPARATUS FOR AUTOMATICALLY FILLING AND DISCHARGING FILTER BEDS.
(Application filed Oct. 13, 1899.)
(No Model.) 2 Sheets—Sheet 1.

Witnesses
Inventor
Samuel H. Adams
by James L. Norris
atty

No. 648,325. Patented Apr. 24, 1900.
S. H. ADAMS.
APPARATUS FOR AUTOMATICALLY FILLING AND DISCHARGING FILTER BEDS.
(Application filed Oct. 13, 1899.)
(No Model.) 2 Sheets—Sheet 2.

Witnesses
Inventor
Samuel H. Adams
By James L. Norris
atty

UNITED STATES PATENT OFFICE.

SAMUEL HENRY ADAMS, OF HARROGATE, ENGLAND.

APPARATUS FOR AUTOMATICALLY FILLING AND DISCHARGING FILTER-BEDS.

SPECIFICATION forming part of Letters Patent No. 648,325, dated April 24, 1900.

Application filed October 13, 1899. Serial No. 733,520. (No model.)

*To all whom it may concern:*

Be it known that I, SAMUEL HENRY ADAMS, a subject of the Queen of Great Britain, residing at Cumbrae, Park avenue, Harrogate, in the county of York, England, have invented certain new and useful Improvements in Apparatus for the Automatic Filling and Discharging of Filter Beds and Tanks, of which the following is a specification.

In cases where what are called "bacterial" or other similar filter-beds are used for the purifying of liquid it is customary to provide a series of such beds or filters, and having first filled one the liquid is allowed to stand therein in contact with the filtering medium, the supply meanwhile being turned to another filter-bed, and so on until all have been filled. The contents of the beds first filled after having stood any desired length of time are discharged to another bed at a lower level for more perfect filtration or to the outfall, and the beds are then allowed to stand empty for a time for aeration before being again flooded with liquid. It is evident that if these operations are controlled by hand the continual vigilance of an attendant is required.

The object of my invention is to provide apparatus which will do what is required automatically and with few or no moving parts; and for the purpose of my invention I provide in a channel or in a scum or collecting tank, from which any desired number of filter-beds draw their supply, a feed apparatus for each of any desired number of filter-beds to supply these beds, this feed apparatus being constructed somewhat as a siphon-trap having a deep seal, and in combination with the said feed apparatus I provide means for introducing air automatically therein to stop the flow of liquid through it and for automatically releasing the air again to allow the liquid to resume its flow.

Figure 1:
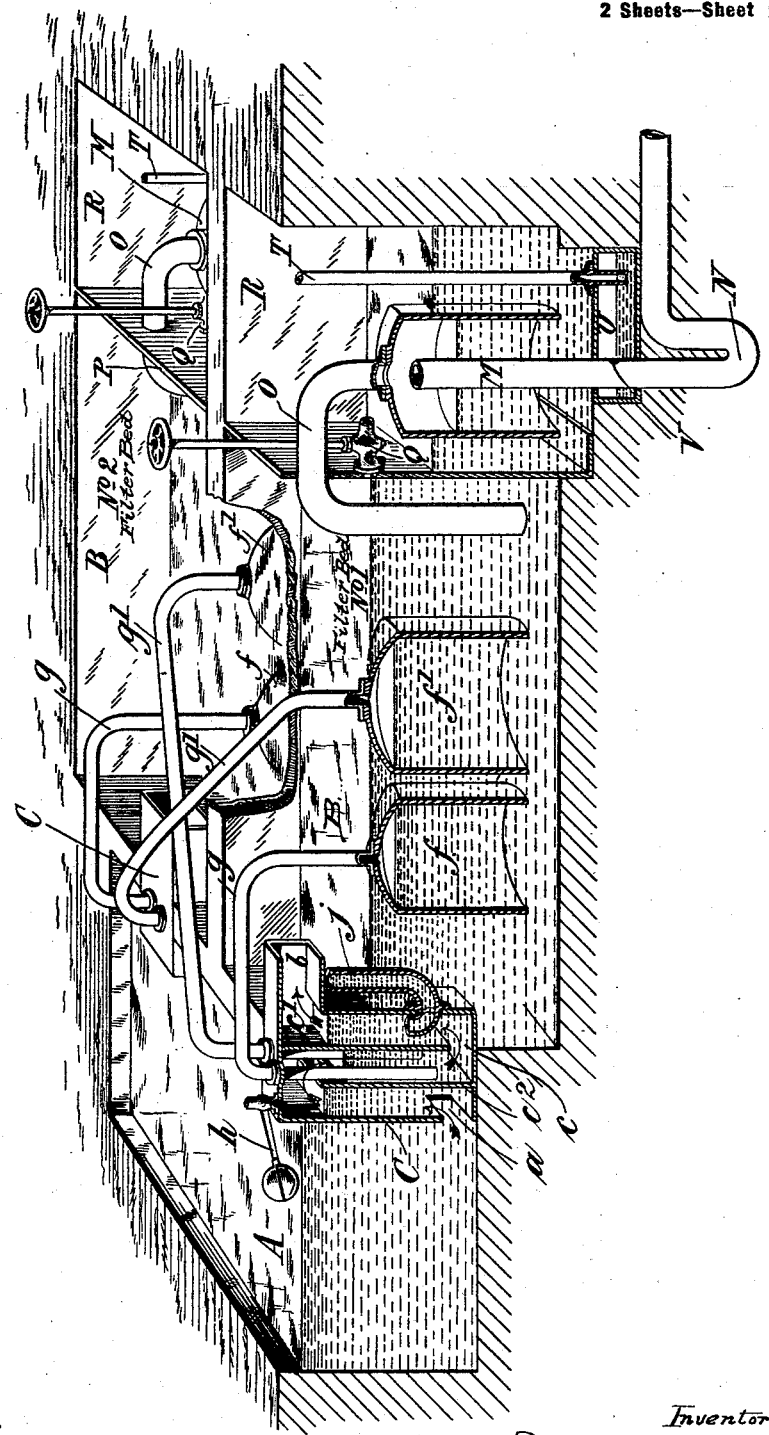
Figure 2:
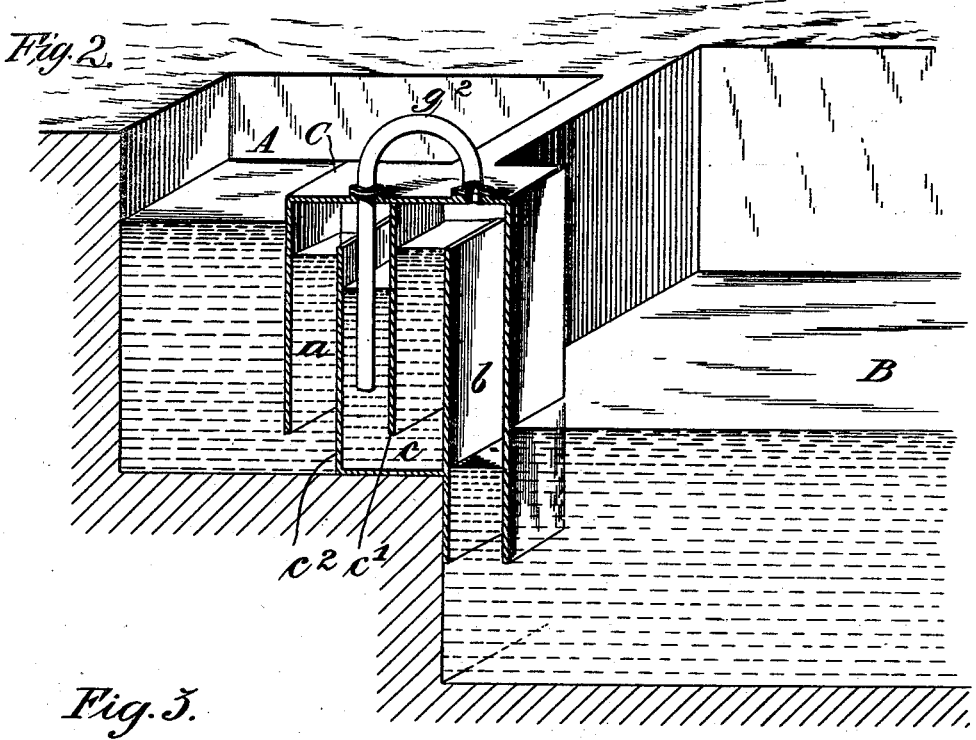
Figure 3:
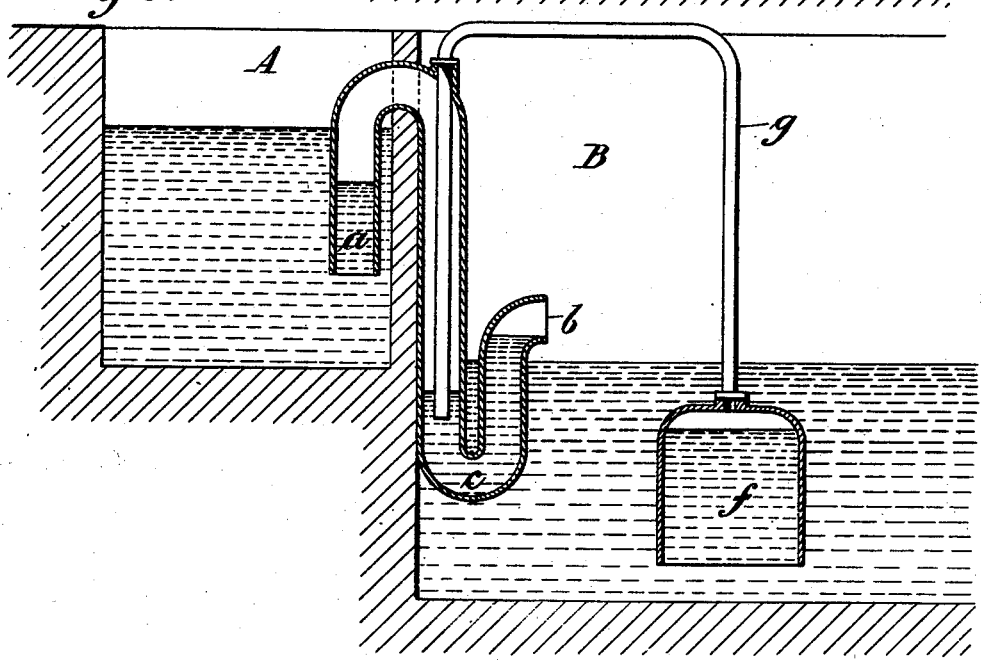

Referring to the accompanying drawings, Figure 1 is a sectional perspective view of two filter-beds and a feed-channel or collecting-tank, together with feed and discharging apparatus constructed according to my invention; and Figs. 2 and 3 are sectional views illustrating modified forms of feed apparatus.

Like letters of reference denote corresponding parts in the several figures.

A is the collecting tank or channel; B B, the filter-beds, also designated No. 1 and No. 2; C C, the feed apparatus for conducting the liquid from the tank A to the filter-beds B, and M M the apparatus for discharging the contents of the filter-beds and for delivering the same to other filter-beds at a lower level or to the outfall.

Each feed apparatus C, Fig. 1, is constructed with passages of substantially-rectangular section, $a$ being the inlet, $b$ the outlet, and $c$ a deep trap, formed in said apparatus by a division-plate $c'$, extending from the top wall of the apparatus nearly to the bottom wall, and by a similar plate $c^2$, extending from the bottom wall nearly to the top. The liquid passes over the edge of the plate $c^2$, then under the edge of the plate $c'$, and then out by the outlet $b$.

Within each filter-bed is placed a chamber $f$, closed at the top and open at the bottom and communicating, by means of a pipe, $g$ with the interior of the corresponding feed apparatus C, said pipe preferably dipping into the water seal of the said apparatus. When in operation, the liquid flowing through the feed apparatus follows the course indicated by the arrows in Fig. 1 and passes into the filter-bed, the level of the liquid rising around the chamber $f$, whereupon the air in the said chamber is displaced by the liquid and transferred through the pipe $g$ to the interior of the feed apparatus, where it operates to depress the level of the liquid in said apparatus below the edge of the plate $c^2$, thus stopping the flow of liquid through it. Further flow through the feed apparatus cannot take place until the air therein is released and as the pipe $g$ dips into the liquid seal in the feed apparatus the air cannot return by the said pipe $g$, so that the discharge of the contents of the filter-bed will not start the flow of liquid through its feed apparatus, and therefore special provision must be made for liberating the air which has been confined as above described. For this purpose I provide in the adjacent filter-bed a chamber $f'$, similar to the chamber $f$ above described, and communicating, by means of a pipe $g'$, with the feed apparatus C, said pipe dipping into the seal of the feed apparatus. It will thus be seen that two pipes enter the seal of the feed apparatus, one communicating with the chamber $f$ in the filter-bed fed by said apparatus and the other communicating with a similar chamber $f'$ in the adjacent filter-bed. The action is as follows—that is to say, assuming the flow of liquid to No. 1 filter-bed has been stopped by the air passed into the feed apparatus of said bed from the corresponding chamber $f$ and that the flow is transferred to No. 2 bed, the level of the liquid in the latter filter-bed rises and transfers air from its chamber $f'$ through the pipe $g'$ into the feed apparatus of No. 1 filter-bed in sufficient quantity to force the liquid seal of said apparatus and so release the air, whereupon the liquid will then resume its flow through said apparatus. Should the sectional area of the thoroughfares in the feed apparatus be too large to admit of the forcing of the seal by the air passed therein, as above described, I may provide a small vent-pipe $j$, communicating with said apparatus and open at the top. When the additional air is passed into the feed apparatus, the excess of pressure forces the liquid out of the pipe $j$, and the air following such expulsion immediately relieves the pressure within the feed apparatus and allows the liquid to resume its flow. In this way by arranging two filter-beds as shown in Fig. 1 and placing the chamber $f'$ in No. 1 filter-bed in communication with the feed apparatus of No. 2 filter-bed and the chamber $f'$ in No. 2 filter-bed in communication with the feed apparatus of No. 1 filter-bed the rising of the liquid in one filter-bed causes the liquid to resume its flow through the feed apparatus of the other filter-bed, and so the filter-beds become charged alternately. The same principle can of course be extended to any number of filter-beds in series. The same or similar apparatus can also be used for discharging the filter-beds; but I generally prefer the following special arrangement for discharging—that is to say, a siphon M, placed in a division R of the main filter-bed, formed by a partition P. The said siphon has in this instance a deep seal N and an arm or extension-pipe O, which passes over or through the partition P into the filter-bed. In the partition P is an opening fitted with a cock or valve Q. In operation, the filter bed or tank being filled to the normal level and the supply having ceased, liquid will pass through the cock Q at a rate depending on the size of the opening, into the division R, around the siphon M, and mounting gradually higher will ultimately bring this siphon into operation, whereupon not only the contents of the chamber R, but also those of the filter-bed, will be drawn off. The time taken for sufficient liquid to pass through the cock Q to start the siphon M will be the time during which the liquid will stand upon the filter bed or tank, and by suitably varying the extent of the opening of the cock Q the time during which liquid will thus stand in the filter-bed may be regulated as desired. It is evident that any other type of siphon will answer the same purpose, provided that it has this arm or pipe O extending into the filter-bed.

In some instances a simple opening in the partition P may be used instead of a cock. I prefer to employ, in combination with the siphon M, a vent-pipe T, dipping into the liquid in a trap U, which communicates with the interior of the siphon through an opening V. The pressure within the siphon causes liquid to ascend in the pipe T, which only dips into the liquid so far that when air bursts through this seal up the pipe T the column of liquid in the pipe is of less height than that in the trap N. The air will therefore eventually escape through the pipe T and not through the trap N, and siphonic action will commence. When the liquid has been drawn off down to the bottom, the air entering through this pipe will break siphonic action. By this means I dispense with an air-hole or other means for regulating the amount of air shut in the siphon. The vent-pipe T is very useful for large siphons; but for smaller siphons it may be dispensed with.

In Fig. 2 I show a modified form of feed apparatus by which the need of the additional air vessel $f$ is dispensed with. In this construction the outlet $b$ of the feed apparatus is turned down, as indicated, so that when the liquid rises in the filter-bed it seals the mouth $b$, and the air locked in by the rising liquid passes through the pipe $g^2$ to the interior of the feed apparatus, between the plates $c'$ and $c^2$, and operates to depress the level of the liquid below the edge of the plate $c^2$ and stops the flow through the feed apparatus until the air is allowed to escape, as before described.

The feed apparatus shown in Fig. 3 has circular passages instead of rectangular; but the action is the same as above described with reference to Fig. 1.

I sometimes provide a ball-tap $h$ on the apparatus C for the purpose of automatically releasing the air in said apparatus should the channel or feed-tank A become too full from any cause and so maintaining the flow through the feed apparatus.

What I claim is—

1. The combination, with a filter-bed, of apparatus for passing liquid thereto, a liquid seal in said apparatus, and means for introducing air into the apparatus for the purpose of depressing the level of the liquid therein and so preventing further flow, substantially as described.

2. The combination, with a filter-bed, of apparatus for passing liquid thereto, a liquid seal in said apparatus and means controlled by the rising of the level of liquid in the filter-bed for the purpose of introducing air into the apparatus, substantially as, and for the purpose, described.

3. The combination, with a filter-bed, of apparatus for passing liquid thereto, a liquid seal in said apparatus, a chamber open at the bottom within the filter-bed, and a pipe forming a communication between said chamber and said apparatus for introducing air from the said chamber to the apparatus between the seal and the entering liquid entering the apparatus, substantially as, and for the purpose, described.

4. The combination, with a filter-bed, of apparatus for passing liquid thereto, a liquid seal in said apparatus, a chamber within the filter-bed open at the bottom and communicating by a pipe with the said apparatus for the purpose of introducing air into the seal, another filter-bed, and means for introducing air from said other filter-bed into the aforesaid apparatus, substantially as, and for the purpose specified.

5. The combination, with a filter-bed, of apparatus for passing liquid thereto, a liquid seal in said apparatus, means for introducing air from a chamber in the filter-bed to the said apparatus, another filter-bed, means for introducing air from a chamber in said other filter-bed into the said apparatus, and means for automatically releasing the air from said apparatus when the feed chamber or tank is too full, substantially as described.

6. The combination, with a filter-bed, of apparatus for passing liquid thereto, a liquid seal in said apparatus, a vent-pipe in said apparatus, means for introducing air from the filter-bed into the said seal, another filter-bed, and means for introducing air from a receptacle in said other filter-bed into the apparatus, for the purpose of discharging the liquid from the said vent-pipe and so liberating the confined air, substantially as, and for the purpose, described.

7. The combination, with a filter-bed, of apparatus for discharging the contents thereof, said apparatus comprising a siphon placed in a chamber adjacent to the filter-bed, an elbow-pipe passing from the dome of the siphon into the filter-bed, and an aperture for allowing the liquid to flow from the filter-bed into said siphon-chamber, substantially as described.

8. The combination, with a filter-bed, of apparatus for discharging the contents thereof, said apparatus consisting of a deep trap-siphon placed in a chamber adjacent to the filter-bed, an elbow-pipe passing from the dome of the siphon into the filter-bed, an aperture for allowing the liquid to flow from the filter-bed into said siphon-chamber, a liquid seal communicating with the interior of the siphon, and a vent-pipe dipping into said seal, substantially as described.

9. The combination, with a filter-bed, of apparatus for discharging the contents thereof, said apparatus consisting of a deep trap-siphon placed in a division of the filter-bed, an elbow-pipe passing from the dome of the siphon into the filter-bed, an aperture for allowing the liquid to flow from the filter-bed into the division or compartment containing the siphon, a valve or cock for controlling said aperture, a liquid seal in the siphon-compartment and communicating with the interior of the siphon, and a vent-pipe dipping into said seal, substantially as described.

10. The combination, with a filter-bed, of apparatus for feeding liquid to said bed, a liquid seal in said apparatus, the mouth of the apparatus being turned down so as to be covered when the liquid rises in the filter-bed, and a pipe forming a communication between the outlet end of the apparatus and the seal aforesaid, substantially as described.

In witness whereof I have hereunto set my hand in the presence of two witnesses.

SAMUEL HENRY ADAMS.

Witnesses:
GEORGE WILLIAM CURRY,
HERBERT LAWSON.